(12) United States Patent
Harris et al.

(10) Patent No.: US 8,770,295 B2
(45) Date of Patent: Jul. 8, 2014

(54) THERMALLY STABLE, NONIONIC FOAMING AGENT FOR FOAM FRACTURING FLUIDS

(75) Inventors: Phillip C. Harris, Duncan, OK (US); Jeremy Holtsclaw, Lawton, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 264 days.

(21) Appl. No.: 13/190,523

(22) Filed: Jul. 26, 2011

(65) Prior Publication Data

US 2013/0025869 A1    Jan. 31, 2013

(51) Int. Cl.
*E21B 43/26* (2006.01)
*C09K 8/70* (2006.01)
*C09K 8/38* (2006.01)
*C09K 8/94* (2006.01)

(52) U.S. Cl.
CPC . *C09K 8/703* (2013.01); *C09K 8/38* (2013.01); *C09K 8/94* (2013.01)
USPC ...... 166/308.6; 166/271; 166/401; 166/308.1

(58) Field of Classification Search
USPC ............................ 166/271, 270, 308.5, 401
See application file for complete search history.

(56) References Cited

U.S. PATENT DOCUMENTS

| | | | |
|---|---|---|---|
| 4,428,432 A * | 1/1984 | Pabley | 507/215 |
| 4,486,317 A * | 12/1984 | Sandell | 507/110 |
| 4,982,793 A | 1/1991 | Holtmyer et al. | |
| 5,024,276 A * | 6/1991 | Borchardt | 166/308.6 |
| 5,067,565 A | 11/1991 | Holtmyer et al. | |
| 5,122,549 A | 6/1992 | Holtmyer et al. | |
| 5,253,711 A * | 10/1993 | Mondshine | 166/300 |
| 2001/0003315 A1 * | 6/2001 | Kelly et al. | 166/300 |
| 2004/0019199 A1 * | 1/2004 | Crews | 536/124 |
| 2008/0011486 A1 | 1/2008 | Zhang et al. | |

FOREIGN PATENT DOCUMENTS

| | | |
|---|---|---|
| CA | 2 593 150 A1 | 1/2008 |
| EP | 0 070 076 A2 | 1/1983 |
| JP | 10-287897 | 10/1998 |
| JP | 2005-281525 | 10/2005 |
| WO | WO96/29977 A1 | 10/1996 |
| WO | WO2008152419 A1 | 12/2008 |

OTHER PUBLICATIONS

Extended European Search Report for EP Application No. 12177961.5 dated Nov. 5, 2012.
Smith, Stephen, "Discussion of the History and Relevance of the CO2/H2S Ratio," NACE Corrsion 2011 Conference & Expo, SPE 11065.
Harris et al., "The use of CO2-Based Fracturing Fluids in the Red Fork2 Formation in the Anadarko Basin, Oklahoma," SPE 11575, pp. 1003-1008, 1984.

(Continued)

*Primary Examiner* — Zakiya W Bates
*Assistant Examiner* — Silvana Runyan
(74) *Attorney, Agent, or Firm* — McDermott Will & Emery LLP; Craig W. Roddy (57) ABSTRACT

A method foamed fracturing may include providing a wellbore that extends into a subterranean formation and introducing a foamed fracturing fluid into the subterranean formation at a pressure sufficient to create or enhance at least one fracture in at least a portion of the subterranean formation. The foamed fracturing fluid may generally include an aqueous base fluid, a sugar derivative foaming agent, and a gas.

19 Claims, 4 Drawing Sheets

(56) References Cited

OTHER PUBLICATIONS

Harris et al., "Stimulation Results in the Low-Permeability Wasatch Formation: An Evolution to Foam Fracturing," SPE 11837, pp. 1545-1551, 1984.

Warnock et al., "Successful Field Applications of CO2-Foam Fracturing Fluids in the Arkansas—Lousiana—Texas Region," SPE 11932, pp. 80-88, 1985.

Reidenbach et al., "Rheological Study of Foam Fracturing Fluids Using Nitrogen and Carbon Dioxide," SPE 12026, pp. 31-41, 1986.

Harris et al., "High-Temperature Rheological Study of Foam Fracturing Fluids," SPE 13177, pp. 613-619, 1987.

Harris, "Dynamic Fluid-Loss Characteristics of CO2-Foam Fracturing Fluids," SPE 13180, pp. 89-94, 1987.

Harris, "Effects of Texture on Rheology of Foam Fracturing Fluids," SPE 14257, pp. 249-257, 1989.

Harris, "Constant-Internal-Phase Design Improves Stimulation Results," SPE 17532, pp. 15-19, 1991.

Harris, "A Comparison of Mixed-Gas Foams with N2 and CO2 Foam Fracturing Fluids on a Flow-Loop Viscometer," SPE 20642, pp. 197-203, 1995.

Harris, "Application of Foam Fluids to Minimize Damage During Fracturing," SPE 22394, pp. 673-678, 1992.

Harris, "Rheology of Crosslinked Foams," SPE 28512, pp. 113-116, 1996.

Harris et al., "High-Quality Foam Fracturing Fluids," SPE 35600, pp. 265-273, 1996.

Harris, "High-Rate Foam Fracturing," SPE 39959, pp. 509-521, 1998.

Cognis Corporation, "GRAS Exemption Claim—Polyglucoside Surfactant," Nov. 28, 2007, downloaded from the Internet, URL: http://www.accessdata.fda.gov/scripts/fcn/gras_notices/grn000237.pdf.

Official Action for Australian Patent Application 2012203839 dated Mar. 14, 2014.

* cited by examiner

THERMALLY STABLE, NONIONIC FOAMING AGENT FOR FOAM FRACTURING FLUIDS

BACKGROUND

The invention relates generally to environmentally-friendly, nonionic foaming agents that produce foams with an increased thermal tolerance for use in subterranean formations.

The treatment of subterranean formations penetrated by a wellbore to stimulate the production of hydrocarbons therefrom or to enhance the ability of the formation to accept injected fluids has long been known in the art. One of the most common methods is to subject the formation to a fracturing treatment. This treatment is conducted by injecting a liquid, gas, or two-phase fluid, which generally is referred to as a fracturing fluid, down the wellbore at sufficient pressure and flow rate to fracture the subterranean formation. A proppant material such as sand, fine gravel, sintered bauxite, glass beads, or the like may also be introduced into the fractures to keep the fractures at least somewhat open ("propped") once the fracturing pressure is released. Propped fractures provide larger flow channels through which an increased quantity of a hydrocarbon may flow, thereby increasing the productive rate of a well.

The rheological requirements of a fracture fluid are highly constraining. To adequately propagate fractures in the subterranean formation, a fracturing fluid should exhibit a low leakage rate of liquids into the formation during the fracturing operation. Also, the fracturing fluid should have sufficient body and viscosity to transport and deposit proppant into the cracks in the formation formed during fracturing. The fracturing fluid should readily flow back into the wellbore after the fracturing is complete and leave minimal residue that could impair permeability and conductivity of the formation. Finally, the fracturing fluid should have rheological characteristics that permit it to be formulated and pumped down the wellbore without excessive difficulty or pressure drop friction losses.

The most commonly used fracturing fluids are water-based compositions containing a hydratable high molecular weight polymeric gelling material that increases the viscosity of the fluid. Thickening the fluid reduces leakage of liquids from the fracture fissures into the formation during fracturing and increases proppant suspension capability.

However, a significant number of hydrocarbon bearing subterranean formations do not respond to conventional fracturing fluids. These problematic formations include hydrocarbon reservoirs that are under low pressure, subterranean formations that exhibit low permeability to fluid flow, and formations in which permeability is reduced when exposed to water. For example, clay in formations swells when it absorbs water that reduces permeability. Also, fracturing fluids do not readily flow back out of these difficult formations when the fracturing operation is complete; the fluids remain in the formations and tend to impede the flow of hydrocarbons to the wellbore.

Foamed fracturing fluids are known as an alternative to the conventional all-liquid fracturing fluids and can be designed to meet the desired rheological requirements and to be effective for problematical formations. Foamed fracturing fluids are media in which a relatively large volume of gas is dispersed in a relatively small volume of liquid, usually with the aid of a foaming agent that reduces the surface tension of the fluids and stabilizes small bubbles. The most commonly used gases for foamed fracture fluids, nitrogen and carbon dioxide, are noncombustible, readily available, and relatively cheap. Most commonly used foamed fracturing fluids are water based, although oil and alcohol based foams are known.

Foamed fracture fluids may be superior to conventional liquid fracturing fluids for problematic formations because foams contain less liquid than traditional fracturing fluids and thus have less liquid to retrieve after the fracturing operation is complete. Moreover, the expansion of the gas in the foamed fluid when fracturing pressure in the wellbore is relieved promotes flow of residual fracture fluid liquid back into the wellbore. Moreover, foamed fracturing fluids exhibit low liquid leakage into the formation because they inherently have low liquid concentrations, and the stable two-phase structure characteristic of foams minimizes leakage and promotes proppant transport and placement capability, The most common foaming agents are ionic surfactants. However, ionic surfactants can have compatibility issues with both problematic formations and other additives within a foamed fracturing fluid or subsequent treatment fluid. For example, sandstone and limestone formations have negative surface charges. Thus, when a cationic foaming agent is used in a foamed fracturing operation, the cationic foaming agent may coat the surfaces of the formation leaving the formation oil-wet and/or adversely affect subsequent operations like consolidation and scale-inhibiting operations. In addition, ionic surfactants may be rendered ineffective in the presence of high salt concentrations, and thus are incompatible with brine treatment fluids.

While nonionic foaming agents may be used to overcome incompatibility issues, they tend to be substantially less thermally stable than their ionic counterparts. Further, foams produced from nonionic foaming agents are typically intolerant of oil even at low concentrations, i.e., less than 0.1% in the treatment fluid. This low oil-tolerance can be limiting as many gelling agents, a common additive in foamed fracturing fluids, often contain a hydrocarbon component at significant enough concentration to be incompatible with many nonionic foaming agents.

Thus, there is a need for environmentally-friendly foaming agents compatible with problematic formations that can produce foams with thermal stabilities comparable to the thermal stability of an ionic foam.

SUMMARY OF THE INVENTION

The invention relates generally to environmentally-friendly, nonionic foaming agents that produce foams with an increased thermal tolerance for use in subterranean formations.

In some embodiments, the present invention provides a method comprising: providing a wellbore that extends into a subterranean formation; providing a foamed fracturing fluid that comprises an aqueous base fluid, a sugar derivative foaming agent, and a gas; and introducing the foamed fracturing fluid into the subterranean formation at a pressure sufficient to create or enhance at least one fracture in at least a portion of the subterranean formation.

In other embodiments, the present invention provides a method comprising: providing a wellbore that extends into a subterranean formation; providing a foamed fracturing fluid that comprises an aqueous base fluid, a sugar derivative foaming agent, a gas, and proppant; introducing the foamed fracturing fluid into the subterranean formation at a pressure sufficient to create or enhance at least one fracture in at least a portion of the subterranean formation; and depositing at least a portion of the proppant into the fracture.

In still other embodiments, the present invention provides a stable foamed fluid comprising: an aqueous base fluid; a foaming agent that comprises a sugar derivative; and a gas.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

DETAILED DESCRIPTION

The invention relates generally to environmentally-friendly, nonionic foaming agents that produce foams with an increased thermal tolerance for use in subterranean formations.

The present invention provides nonionic foaming agents, specifically sugar derivatives, which are compatible with brine treatment fluids, ionic additives, and problematic formations like hydrocarbon reservoirs that are under low pressure, subterranean formations that exhibit low permeability to fluid flow, and formations in which permeability is reduced when they absorb water. The sugar derivative foaming agents are capable of producing foamed treatment fluids that are thermally stable to 300° F., which is comparable to the thermal stability of ionic foaming agents and a marked improvement over currently available nonionic foaming agents that produce foams that are stable only to about 200° F. Additionally, the sugar derivative foaming agents described herein are oil-tolerant to a greater extent than traditional nonionic foaming agents, i.e., about 5% versus 0.1% of hydrocarbon in the base fluid. Moreover, the sugar derivative foaming agents of the present invention are biodegradable, i.e., environmentally-friendly, derivatives of sugar. Additionally, some sugar derivative foaming agents presented herein may be produced as a food-grade material, which meets the strictest of environmental regulations.

It should be noted that when "about" is provided at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

In some embodiments, a foamed fracturing fluid may comprise an aqueous base fluid, a gas, and a sugar derivative foaming agent.

Aqueous base fluids suitable for use in the treatment fluids of the present invention may comprise fresh water, saltwater (e.g., water containing one or more salts dissolved therein), brine (e.g., saturated salt water or produced water), seawater, produced water (e.g., water produced from a subterranean formation) or combinations thereof. Generally, the water may be from any source, provided that it does not contain components that might adversely affect the stability and/or performance of the first treatment fluids or second treatment fluids of the present invention. In certain embodiments, the density of the aqueous base fluid can be adjusted, among other purposes, to provide additional particulate transport and suspension in the treatment fluids used in the methods of the present invention. In certain embodiments, the pH of the aqueous base fluid may be adjusted (e.g., by a buffer or other pH adjusting agent), among other purposes, to activate a crosslinking agent and/or to reduce the viscosity of the first treatment fluid (e.g., activate a breaker, deactivate a crosslinking agent). In these embodiments, the pH may be adjusted to a specific level, which may depend on, among other factors, the types of gelling agents, acids, and other additives included in the treatment fluid. One of ordinary skill in the art, with the benefit of this disclosure, will recognize when such density and/or pH adjustments are appropriate.

In some embodiments, the gas is selected from the group consisting of nitrogen, carbon dioxide, air, methane, helium, argon, and any combination thereof. In some embodiments, the quality of the foamed fracturing fluid may range from a lower limit of about 5%, 10%, 25%, 40%, 50%, 60%, or 70% gas volume to an upper limit of about 99%, 90%, 80%, 75%, 60%, or 50% gas volume, and wherein the quality of the foamed fracturing fluid may range from any lower limit to any upper limit and encompass any subset between the upper and lower limits.

Generally, the sugar derivative foaming agent may be a sugar molecule derivatized such that the sugar derivative can act as a foaming agent, i.e., a surface active agent. As used herein, sugar generally refers to compounds with the basic building block of a hexose with the general formula $C_6H_{12}O_6$. In some embodiments, the hexose may be an aldose with an aldehyde in position one or a ketose with one ketone per hexose. In some embodiments, the sugar derivative may be a derivative of monosaccharides (one hexose); disaccharides (two hexoses); trisaccharides (three hexoses); any isomer thereof; and any combination thereof. In some embodiments, the sugar derivative may be a derivative of glucose, fructose, galactose, allose, altrose, mannose, idose, talose, sucrose, lactose, lactulose, maltose, trehalose, cellobiose, nigerotriose, maltotriose, maltotriulose, raffinose, any isomer thereof, and any combination thereof.

In some embodiments, the sugar derivative may be a monoester derivative, a diester derivative, a triester derivative, monoethoxylate derivative, a diethoxylate derivative, a triethoxylate derivative, and any combination thereof. One skilled in the art would understand this terminology, i.e., triethoxalate derivative is a sugar molecule with three derivatives with each attached via an ether bond. In some embodiments, the sugar derivative may be a sugar derivatized with at least one alkyl chain having between about 6 carbon units and about 26 carbon units. In some embodiments, the sugar derivative may be a sugar molecule derivatized with at least one alkyl chain having between about 10 carbon units and about 20 carbon units. In some embodiments, the sugar derivative may be a sugar molecule derivatized with a hydrocarbon chain that is saturated, like stearic acid-based, or unsaturated, like oleaic acid-based fatty acids.

In some embodiments, the sugar derivative foaming agent may be a mixture of two or more sugar derivatives. In some embodiments, the sugar derivative foaming agent may be classified with a chemical grade including, but not limited to, food-grade, American Chemical Society (ACS)-grade, reagent-grade, United States Pharmacopeia (USP)-grade, national formulary (NF)-grade, lab-grade, purified-grade, technical-grade, and any combination thereof.

One skilled in the art, with the benefit of this disclosure, should understand that the concentration of the sugar derivative foaming agent in the foamed fracturing fluid may depend on several factors including, but not limited to, the bottom hole static temperature of the wellbore, the salinity and pH of the foamed fracturing fluid, and the other additives included in the foamed fracturing fluid. In some embodiments, the sugar derivative foaming agent may be present in the fracturing fluid in an amount ranging from a lower limit of about 0.005%, 0.01%, 0.05%, or 0.1% w/w of aqueous base fluid to an upper limit of about 2%, 1%, or 0.5% w/w of aqueous base fluid, and wherein the amount may range from any lower limit to any upper limit and encompass any subset between the upper and lower limits. It should be noted that a sugar derivative foaming agent may be provided in a liquid form, including in a diluted suspension, e.g., 30% w/w in water. As such, one skilled in the art would understand to appropriately include the liquid to achieve the correct concentration of the sugar derivative foaming agent, i.e., active ingredient, measured in weight percent.

In some embodiments, a foamed fracturing fluid may optionally comprise an additive including, but not limited to, a salt; an inert solid; a fluid loss control agent; an emulsifier; a dispersion aid; a corrosion inhibitor; an emulsion thinner; an emulsion thickener; a viscosifying agent; a surfactant; a particulate; a lost circulation material; a second foaming agent; a pH control additive; a breaker; a biocide; a crosslinker; a stabilizer; a chelating agent; a scale inhibitor; a mutual solvent; an oxidizer; a reducer; a friction reducer; a clay stabilizing agent; a proppant; a gelling agent; and any combination thereof.

In some embodiments, a foamed fracturing fluid may comprise a plurality of proppant particulates. Proppant particulates suitable for use in the present invention may comprise any material suitable for use in subterranean operations. Suitable materials for these particulates include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, resin coated sand, and any combination thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and any combination thereof. The mean particulate size generally may range from about 2mesh to about 400 mesh on the U.S. Sieve Series; however, in certain circumstances, other mean particulate sizes may be desired and will be entirely suitable for practice of the present invention. In particular embodiments, preferred mean particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and combinations thereof. Moreover, fibrous materials, that may or may not be used to bear the pressure of a closed fracture, may be included in certain embodiments of the present invention. In some embodiments, the proppant particulates may be present in the first treatment fluids of the present invention in an amount ranging from a lower limit of about 0.5, 1, or 5 pounds per gallon ("ppg") to an upper limit of about 30, 25, 20, 15, or 10 ppg of the foamed fracturing fluid, and wherein the amount of proppant particulates may range from any lower limit to any upper limit and encompass any subset between the upper and lower limits.

In some embodiments, a foamed fracturing fluid may comprise a gelling agent. Gelling agents suitable for use in the present invention may comprise any substance, e.g., a polymeric material, capable of increasing the viscosity of the foamed fracturing fluid. In certain embodiments, the gelling agent may comprise one or more polymers that have at least two molecules that are capable of forming a crosslink in a crosslinking reaction in the presence of a crosslinking agent, and/or polymers that have at least two molecules that are so crosslinked, i.e., a crosslinked gelling agent. The gelling agents may be naturally-occurring gelling agents, synthetic gelling agents, or a combination thereof. The gelling agents also may be cationic gelling agents, anionic gelling agents, nonionic gelling agents, amphoteric gelling agents, or a combination thereof. Suitable gelling agents include, but are not limited to, polysaccharides, biopolymers, and/or derivatives thereof that contain one or more of these monosaccharide units: galactose, mannose, glucoside, glucose, xylose, arabinose, fructose, glucuronic acid, or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, scleroglucan, diutan, and any combination thereof. In certain embodiments, the gelling agents comprise an organic carboxylated polymer, such as CMHPG.

Suitable synthetic polymers include, but are not limited to, 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamido-and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylrnethacrylamide, dimethyldiallylamrnonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylarninoethylmethacrylate, any derivative thereof, and any combination thereof. In certain embodiments, the gelling agent comprises an acrylamide/2-(methacryloyloxy)ethyltrimethylammonium methyl sulfate copolymer. In certain embodiments, the gelling agent may comprise an acrylamide/2-(methacryloyloxy)ethyltrimethylammonium chloride copolymer. In certain embodiments, the gelling agent may comprise a derivatized cellulose that comprises cellulose grafted with an allyl or a vinyl monomer, such as those disclosed in U.S. Pat. Nos.

4,982,793, 5,067,565, and 5,122,549, the entire disclosures of which are incorporated herein by reference.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

In some embodiments, a foamed fracturing fluid may comprise a gelling agent that contains hydrocarbons. In some embodiments, a foamed fracturing fluid may comprise a gelling agent such that the hydrocarbon content ranges from a lower limit of about 0.01%, 0.1%, 0.5%, or 1% to an upper limit of about 10%, 5%, or 1% by volume of aqueous base fluid, and wherein the amount of hydrocarbon content may range from any lower limit to any upper limit and encompass any subset between the upper and lower limits. Suitable gelling agents that comprise hydrocarbons include, but are not limited to, guar, hydroxylpropyl guar (HPG), carboxymethylhydroxylpropyl guar (CMHPG), WG-36 (a guar gelling agent, available from Halliburton Energy Services, Inc.), WG-11 (a guar derivative gelling agent, available from Halliburton Energy Services, Inc.), and WG-18 (a guar derivative gelling agent, available from Halliburton Energy Services, Inc.), each of which may be liquid gel concentrates (LGC) and/or ultra clean (UC).

The gelling agent may be present in the foamed fracturing fluid useful in the methods of the present invention in an amount sufficient to provide the desired viscosity. In some embodiments, the gelling agents (i.e., the polymeric material) may be present in an amount ranging from a lower limit of about 0.05%, 0.1%, 0.15%, or 0.5% to an upper limit of about 0.5%, 1%, or 2% by weight of the aqueous base fluid, and wherein the amount of gelling agent may range from any lower limit to any upper limit and encompass any subset between the upper and lower limits.

In some embodiments, a foamed fracturing fluid may further comprise an additional foaming agent which may be cationic, anionic, amphoteric, or nonionic.

In some embodiments, a foamed fracturing fluid may be introduced into a subterranean formation at a pressure sufficient to create or enhance at least one fracture in at least a portion of the subterranean formation.

After the introduction of the full amount of the calculated or estimated volume of foamed fracturing fluid necessary to fracture the formation and optionally transport the desired quantity of proppant material into the created fracture, the wellbore may be shut-in for a period of time sufficient to permit stabilization of the subterranean formation. In some embodiments, the wellbore is shut-in for a period of time to permit the formation to at least partially close upon the proppant material and stabilize the fracture volume. The shut-in period can be from several minutes to in excess of about 12 hours and, preferably, is in the range of from about 0.5 to 2 hours. After the subterranean formation has stabilized, the wellbore may be opened under controlled conditions and the pressure drop in the wellbore causes the foam to expand toward the wellbore. The foamed fracturing fluid then moves from the formation into the wellbore and exits the wellbore at the surface. The expanding gas may carry a substantial portion of the liquids present in the fracturing area from the formation thereby leaving the formation and wellbore clean and ready for the commencement of production.

The methods and compositions of the present invention may be suitable for use in nearly all subterranean formations. In some embodiments, the sugar derivative foaming agent may be particularly well suited for use in a formation with charged surfaces or with water sensitivity like swelling or sloughing shales, salt formations, sandstone formations, limestone formations, and coal formations. In some embodiments, the subterranean formation may have a bottom hole static temperature greater than about 200° F. In some embodiments, the subterranean formation may have a bottom hole static temperature less than about 300° F. In some embodiments, the subterranean formation may have a bottom hole static temperature ranging from about 80° F. to about 300° F.

In one embodiment, a foamed fracturing fluid may generally be an aqueous base fluid, a gas, and a sugar derivative foaming agent. A method of using said foamed fracturing fluid may include introducing the foamed fracturing fluid into a subterranean formation at a pressure sufficient to create or enhance at least one fracture in at least a portion of the subterranean formation. Further, a wellbore may extend into the subterranean formation.

In one embodiment, a foamed fracturing fluid may generally be an aqueous base fluid, a gas, a sugar derivative foaming agent, and a proppant. A method of using said foamed fracturing fluid may include introducing the foamed fracturing fluid into a subterranean formation at a pressure sufficient to create or enhance at least one fracture in at least a portion of the subterranean formation and depositing at least a portion of the proppant into the fracture. Further, a wellbore may extend into the subterranean formation.

In one embodiment, a stable foamed fluid may generally be an aqueous base fluid, a sugar derivative foaming agent, and a gas.

Although primarily described in terms of foamed fracturing fluids, the sugar derivative foaming agents may be used in many different types of subterranean treatment operations. Typically the sugar derivative foaming agent would be used as a treatment fluid additive including, but not limited to, as a dispersant, a surfactant, an emulsifier, a fines stabilizer, and the like. Suitable subterranean treatment operations include, but are not limited to, drilling operations, cementing operations, lost circulation operations, stimulation operations, sand control operations, completion operations, scale inhibiting operations, water-blocking operations, clay stabilizer operations, fracturing operations, frac-packing operations, gravel packing operations, wellbore strengthening operations, and sag control operations. The methods and compositions of the present invention may be used in large-scale operations or pills. As used herein, a "pill" is a type of relatively small volume of specially prepared treatment fluid placed or circulated in the wellbore.

To facilitate a better understanding of the present invention, the following examples of preferred embodiments are given. In no way should the following examples be read to limit, or to define, the scope of the invention.

EXAMPLES

Thermal Stability. Foam thermal stability was tested in a high-pressure, high-temperature recirculating foam flow loop viscometer. Generally, the viscometer is a 25 ft, 3/10" ID pipe with a recirculating pump. The water, foaming agent, and other additives are added to the pipe, circulated, and pressurized to 1000 PSI. Then gas, typically $N_2$ or $CO_2$, is added while circulating at 1000 $s^{-1}$ until a foam of 70% quality is achieved. The foamed fluid is then circulated at a given shear rate of 170 $s^{-1}$ and heated at a rate of 10° F./min. The viscosity is measured as a function of the pressure drop across a 10 ft-section of the pipe.

Using the above procedure, foaming agents EXPO 0.049 (sucrose laurate, available from EXPO Chemical) and RYOTO SUGAR ESTER L-1695 (sucrose laurate, available from Mitsubishi Chemical Corporation) were tested. The sample consisted of water, foaming agent at 7 gpt (gallons per 1000 gallons of aqueous base fluid), and LGC-36 UC at 6 gpt. It should be noted that the EXPO 0.049 is a 30% active ingredient in water. Nitrogen was used in foaming the sample to 70% quality, The flow loop was shut-in and the foam equilibrated at a shear rate of 1000 s$^{-1}$. Once the foam equilibrated, heating began. The viscosity was recorded as the temperature increased to 300° F., FIG. 1.

Figure 1:
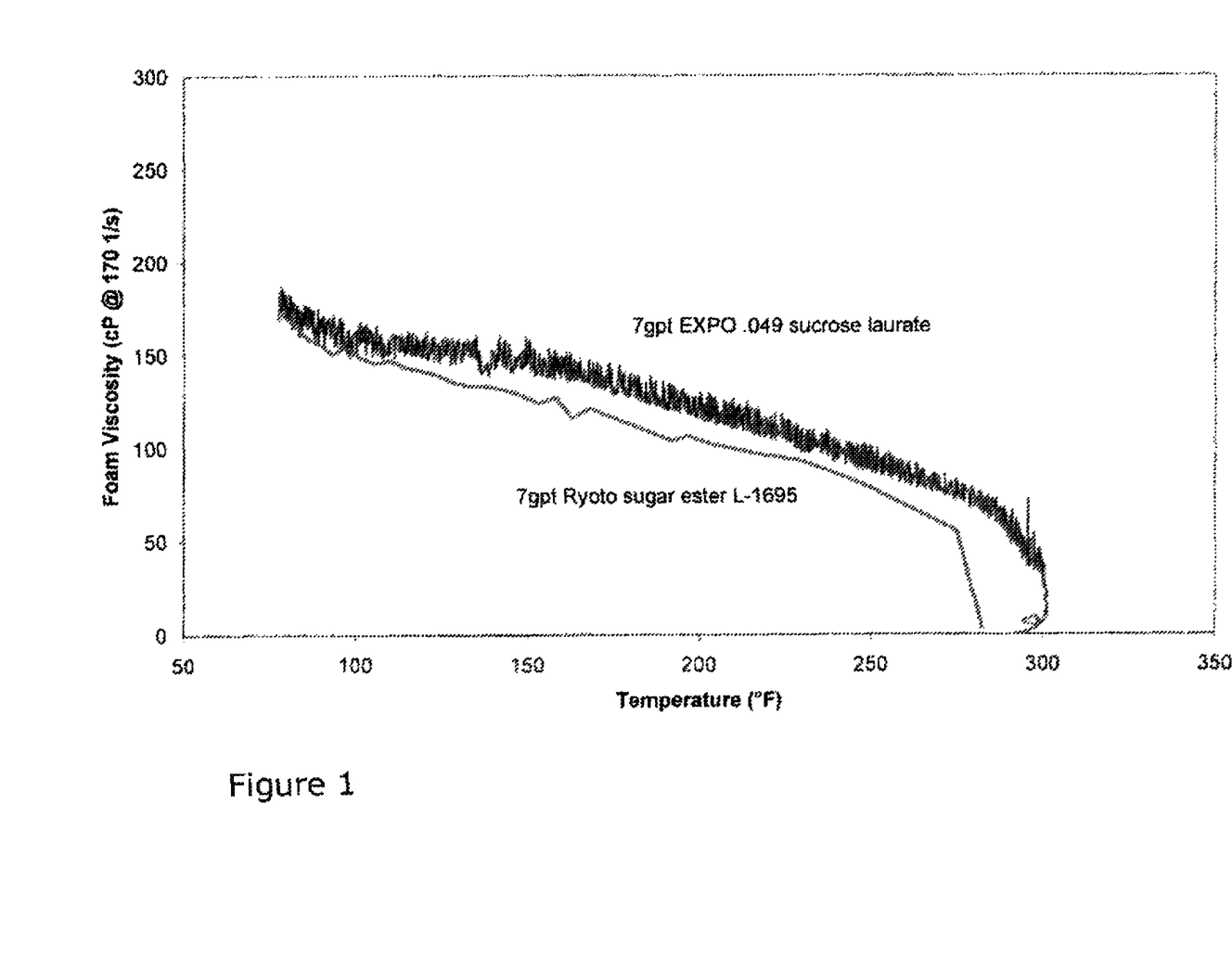
FIG. 1 shows the thermal stability of the sugar derivative foaming agent.
Figure 2A:
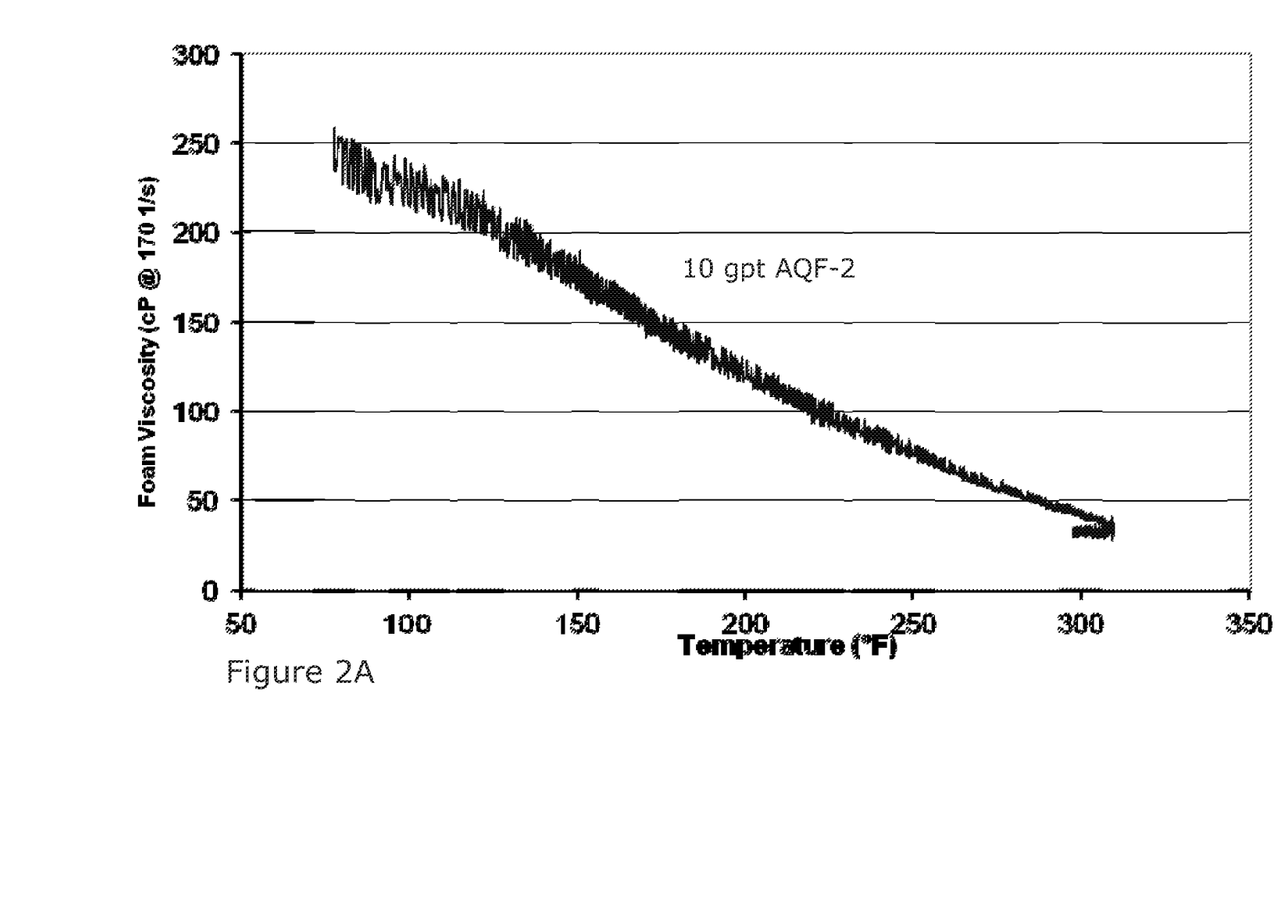
FIGS. 2A-C show the thermal stability of common ionic and nonionic foaming agents.
Figure 2B:
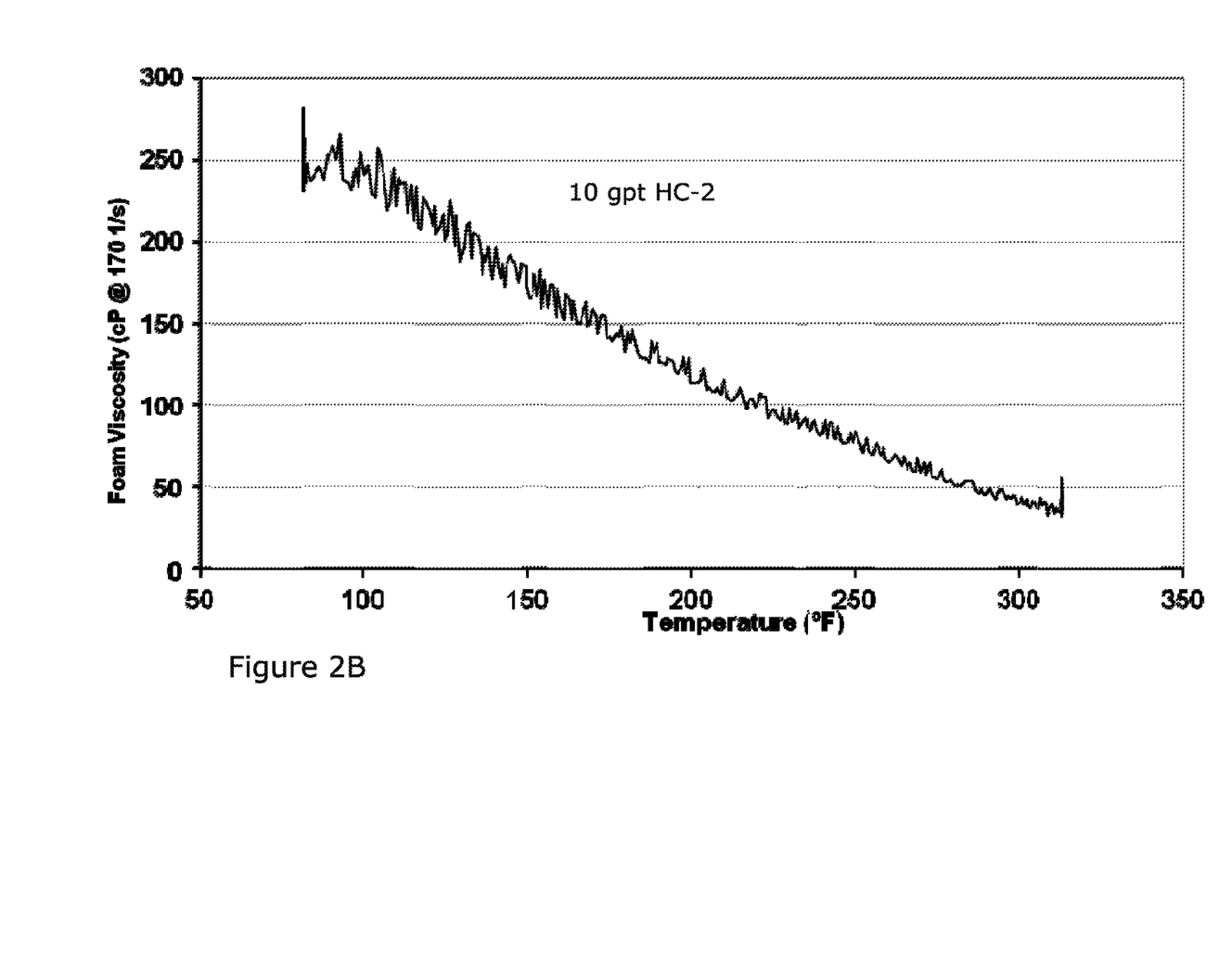
Figure 2C:
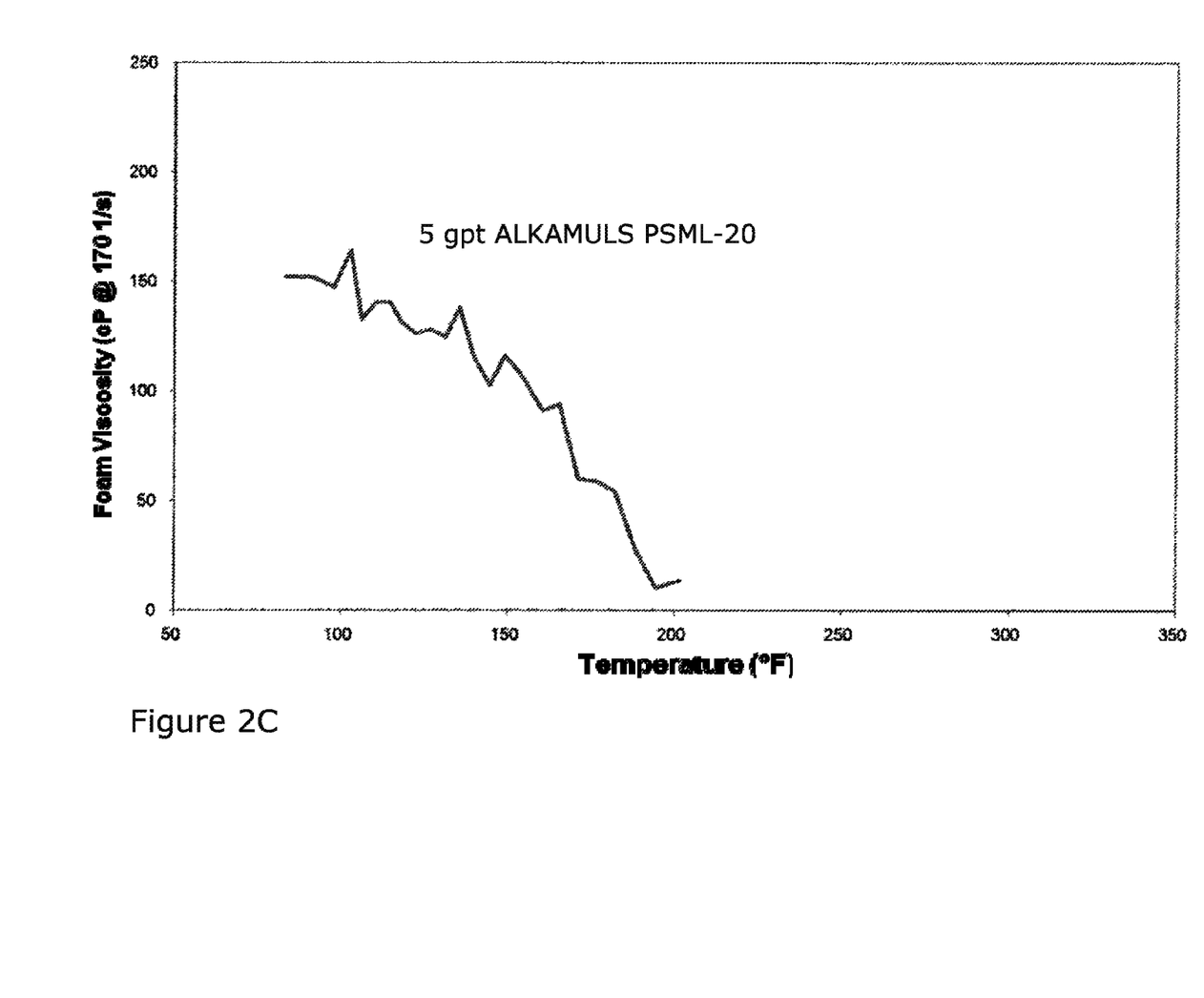

For comparison, FIGS. 2A-2C show results from a similar test with an anionic foaming agent AQF-2 (anionic surfactant, available from Halliburton Energy Services, Inc.) at 10 gpt, an amphoteric foaming agent HC-2 (amphoteric surfactant, available from Halliburton Energy Services, Inc.) at 10 gpt, and a nonionic foaming agent ALKAMULS® PSML-20 (polyethoxylated sorbitan monolaurate, available from Rhodia Novecare) at 5 gpt. A comparison of these results to FIG. 1 shows the thermal stability of a foam produced from the sugar derivative foaming agent to be comparable to ionic and amphoteric foaming agents, which are most widely used in foamed fracturing fluids. Further, the sugar derivative foaming agent is thermally stable to about 100° F. greater than the nonionic foaming agent.

This example demonstrates the thermal stability of foams produced from a sugar derivative foaming agent are enhanced over other nonionic foaming agents and comparable to ionic foaming agents.

Oil-Tolerance. A foam of sugar ester ~40% v/v foaming agent and 100 mL water with a quality of about 70-80% was generated in a 1-L blender jar by blending at low speed to high speed. Kerosene was added to the foam. At concentration greater than 5% by volume of water, kerosene destabilized the foam.

This example demonstrates the enhanced oil-tolerance of foams produced from a sugar derivative foaming agent.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing a wellbore that extends into a subterranean formation;
providing a foamed fracturing fluid that comprises an aqueous base fluid, a sugar derivative foaming agent, and a gas, wherein the sugar derivative is classified as food-grade; and
introducing the foamed fracturing fluid into the subterranean formation at a pressure sufficient to create or enhance at least one fracture in at least a portion of the subterranean formation.

2. The method of claim 1, wherein the sugar derivative is selected from the group consisting of a monoester derivative, a diester derivative, a triester derivative, a monoethoxylate derivative, a diethoxylate derivative, a triethoxylate derivative, and any combination thereof.

3. The method of claim 1, wherein the sugar derivative comprises an alkyl chain having between about 6 carbon units and about 26 carbon units.

4. The method of claim 1, wherein the sugar derivative is a derivative of a monosaccharide, a disaccharide, or a trisaccharide.

5. The method of claim 1, wherein the sugar derivative is a derivative of a sugar selected from the group consisting of glucose, fructose, galactose, allose, altrose, mannose, idose, talose, sucrose, lactose, lactulose, maltose, trehalose, cellobiose, nigerotriose, maltotriose, maltotriulose, raffinose, any isomer thereof, and any combination thereof.

6. The method of claim 1, wherein the foaming agent is present in the fracturing fluid at about 0.005% to about 2% w/w of the aqueous base fluid.

7. The method of claim 1, wherein the gas is selected from the group consisting of nitrogen, carbon dioxide, air, methane, helium, argon, and any combination thereof.

8. The method of claim 1, wherein the quality of the foamed fracturing fluid is in the range of about 5% gas volume to about 99% gas volume.

9. The method of claim 1, wherein the foamed fracturing fluid further comprises a gelling agent.

10. The method of claim 1, wherein the foamed fracturing fluid further comprises a proppant.

11. The method of claim 1, wherein the wellbore has a bottom hole static temperature greater than about 200° F.

12. The method of claim 1, wherein the foamed fracturing fluid further comprises an additive selected from the group consisting of a salt; an inert solid; a fluid loss control agent; an emulsifier; a dispersion aid; a corrosion inhibitor; an emulsion thinner; an emulsion thickener; a viscosifying agent; a surfactant; a particulate; a lost circulation material; a second foaming agent; a pH control additive; a breaker; a biocide; a crosslinker; a stabilizer; a chelating agent; a scale inhibitor; a mutual solvent; an oxidizer; a reducer; a friction reducer; a clay stabilizing agent; and any combination thereof.

13. The method of claim 1, wherein the sugar derivative is a derivative of a sugar selected from the group consisting of allose, altrose, mannose, idose, talose, sucrose, lactose, lactulose, maltose, trehalose, cellobiose, nigerotriose, maltotriose, maltotriulose, raffinose, any isomer thereof, and any combination thereof.

14. The method of claim 1, wherein the sugar derivative is a derivative of a sugar selected from the group consisting of altrose, mannose, sucrose, lactose, lactulose, maltose, trehalose, cellobiose, nigerotriose, maltotriose, maltotriulose, raffinose, any isomer thereof, and any combination thereof.

15. The method of claim 1, wherein the sugar derivative is a sucrose derivative.

16. A method comprising:
    providing a wellbore that extends into a subterranean formation;
    providing a foamed fracturing fluid that comprises an aqueous base fluid, a sugar derivative foaming agent, a gas, and proppant, wherein the sugar derivative is classified as food-grade;
    introducing the foamed fracturing fluid into the subterranean formation at a pressure sufficient to create or enhance at least one fracture in at least a portion of the subterranean formation; and
    depositing at least a portion of the proppant into the fracture.

17. The method of claim 16, wherein the sugar derivative is selected from the group consisting of a monoester derivative, a diester derivative, a triester derivative, and any combination thereof.

18. The method of claim 16, wherein the sugar derivative is a derivative of a monosaccharide, a disaccharide, or a trisaccharide.

19. The method of claim 16, wherein the sugar derivative is a derivative of a sugar selected from the group consisting of glucose, fructose, galactose, allose, altrose, mannose, idose, talose, sucrose, lactose, lactulose, maltose, trehalose, cellobiose, nigerotriose, maltotriose, maltotriulose, raffinose, any isomer thereof, and any combination thereof.

* * * * *